United States Patent [19]

Buma

[11] Patent Number: 5,647,580
[45] Date of Patent: Jul. 15, 1997

[54] SELF-PUMPING TYPE SHOCK ABSORBER WITH MEANS FOR VARIABLY CONTROLLING DAMPING FORCE

[75] Inventor: Shuuichi Buma, Susono, Japan

[73] Assignee: Toyota Jidosha Kabushiki Kaisha, Nagoya, Japan

[21] Appl. No.: 578,238

[22] Filed: Dec. 26, 1995

[30] Foreign Application Priority Data

Jan. 31, 1995 [JP] Japan ..................... 7-34627

[51] Int. Cl.$^6$ ........................ B60G 17/04
[52] U.S. Cl. ................ 267/64.17; 267/DIG. 2
[58] Field of Search ............ 267/64.17, DIG. 2, 267/DIG. 1, 64.16, 218; 137/843, 859; 188/315, 318, 298

[56] References Cited

U.S. PATENT DOCUMENTS

| | | | |
|---|---|---|---|
| 3,409,286 | 11/1968 | Erdmann | 267/DIG. 2 |
| 4,577,840 | 3/1986 | Meller et al. | 267/64.17 |
| 4,993,693 | 2/1991 | Lohr et al. | 267/64.17 |

FOREIGN PATENT DOCUMENTS

| | | |
|---|---|---|
| 36-11013 | 2/1959 | Japan. |
| 48-59515 | 8/1973 | Japan. |
| 59-159441 | 9/1984 | Japan. |

*Primary Examiner*—Douglas C. Butler
*Attorney, Agent, or Firm*—Oliff & Berridge

[57] ABSTRACT

In the self-pumping type shock absorber wherein the working fluid is pumped up from a reservoir to an accumulator by a pump operated in accordance with the expansion and contraction stroke of the shock absorber cylinder-piston assembly so that the pressurized working fluid is supplied to the cylinder chamber space of the cylinder-piston assembly so as to increase the overall length of the cylinder-piston assembly such as to increase the vehicle height supported thereby, the passage for conducting the pumped up working fluid into the accumulator and the passage for conducting the stored high pressure working fluid from the accumulator into the cylinder chamber space are separated and a variably controllable throttle is provided in the latter passage, so that a variably controlled additional damping force is uniformly available throughout the expansion and contraction strokes of the shock absorber.

10 Claims, 8 Drawing Sheets

SELF-PUMPING TYPE SHOCK ABSORBER WITH MEANS FOR VARIABLY CONTROLLING DAMPING FORCE

BACKGROUND OF THE INVENTION

1. Field of the Invention

The present invention relates to a shock absorber, and more particularly, to a self-pumping type shock absorber.

2. Description of the Prior Art

As a shock absorber of a vehicle such as an automobile there is known a self-pumping type shock absorber as disclosed in, for example, Japanese Patent Laid-open Publication 59-159441, which comprises:

a shock absorbing cylinder-piston assembly having a cylinder bore and a piston, said piston including a disk portion and a rod portion and being slidably engaged in said cylinder bore at said disk portion to define first and second chamber spaces for receiving a working fluid therein, said rod portion extending through said second chamber space out of said cylinder bore;

means for providing a first throttle passage for applying a throttling action to the working fluid flowing from said first chamber space to said second chamber space;

means for providing a second throttle passage for applying a throttling action to the working fluid flowing from said second chamber space to said first chamber space;

a pumping cylinder-piston assembly having a cylinder bore and a piston slidably engaged in said pump cylinder bore to define a pumping chamber for the working fluid, said pumping cylinder-piston assembly being incorporated in said shock absorbing cylinder-piston assembly such that said pump cylinder is provided in said shock absorber piston as a bore coaxially formed therein, while said pump piston is provided as a rod means extending in the shock absorber cylinder bore, so as to thereby obtain a pumping operation synchronized with the shock absorbing operation of said shock absorbing cylinder-piston assembly;

a reservoir for storing the working fluid;

means for providing a relief passage for connecting said first chamber space with said reservoir when said shock absorber cylinder-piston assembly expands beyond a predetermined expansion limit;

an accumulator for accumulating a variable volume of the working fluid, said accumulator having means for applying an elevated pressure to the working fluid accumulated therein; and means for providing a first connection passage for connecting said pumping chamber with said reservoir, including a check valve for allowing the working fluid to flow only from said reservoir to said pumping chamber;

means for providing a second connection passage for connecting said first chamber space with said pumping chamber, including a check valve for allowing the working fluid to flow only from said pumping chamber to said first chamber space; and means for providing a third passage for connecting said accumulator with said first chamber space.

When such a self-pumping type shock absorber repeats the expansion and contraction strokes, with concurrent repetition of the intake delivery strokes of the pump, the working fluid is pumped up from said reservoir to said first chamber space, so that the shock absorber gradually expands, and when the shock absorber expands to a predetermined expansion limit value, said relief passage connects said first chamber to said reservoir, whereby the shock absorber does not expand any more. Therefore, when the vehicle height decreases due to a heavy load, etc., the vehicle height is automatically resumed to the standard vehicle height while the vehicle wheel bounds and rebounds. Therefore, the shock absorber can self control the vehicle height at the standard level without any motor driven pump.

In order to improve various performances of the automobile, such as driving comfortableness, steerability, etc., the performance of the suspension is essential, and the suspension performance is much dependent on the damping performance of the shock absorber. Therefore, it is desired that the shock absorber has a damping force variable construction. According to an orthodox technical measure, the damping force of a cylinder-piston type shock absorber would be variably controlled by providing a bypass passage for connecting the working fluid chambers on the opposite sides of the piston and incorporating a variable throttle valve in the bypass passage. When the shock absorber is a self-pumping type shock absorber having a working fluid pumping system such as described above, it will be contemplated to incorporate a variable throttle means in the pumping system to apply a variably controlled throttling action to the flow of working fluid in the pumping system.

However, in the above-mentioned prior art shock absorber, the flow of working fluid in said first passage for connecting the pumping chamber with the reservoir is available only during the suction stroke of the pumping system, i.e. the expansion stroke of the shock absorber; the flow of working fluid in said second passage for connecting said first chamber space with said pumping chamber is available only during the delivery stroke of the pumping system, i.e. the contraction stroke of the shock absorber; and the flow of working fluid in said third passage for connecting said accumulator with said first chamber space is the sum of the pump delivery and the volume corresponding to the reduction of the effective space of the shock absorber cylinder bore due to more further insertion of the piston rod therein during the contraction stroke of the shock absorber, while the flow of working fluid through said third passage during the expansion stroke of the shock absorber is only the volume corresponding to the increase of the effective space of the shock absorber cylinder bore due to less insertion of the piston rod. Therefore, none of those passages provides any substantially uniform flow of working fluid to apply a variably controlled additional damping force during both expansion and contraction strokes of the shock absorber.

SUMMARY OF THE INVENTION

Therefore, it is a primary object of the present invention to provide a self-pumping type shock absorber which provides a substantially uniform variably controlled additional damping force during both expansion and contraction strokes by utilizing the self-pumping system thereof.

According to the present invention, the above-mentioned object is accomplished by a self-pumping type shock absorber comprising:

a shock absorbing cylinder-piston assembly having a cylinder bore and a piston, said piston including a disk portion and a rod portion and being slidably engaged in said cylinder bore at said disk portion to define first and second chamber spaces for receiving a working fluid therein, said rod portion extending through said second chamber space out of said cylinder bore;

means for providing a first throttle passage for applying a throttling action to the working fluid flowing from said first chamber space to said second chamber space;

means for providing a second throttle passage for applying a throttling action to the working fluid flowing from said second chamber space to said first chamber space;

a pumping cylinder-piston assembly having a cylinder bore and a piston slidably engaged in said pump cylinder bore to define a pumping chamber for the working fluid;

means for mechanically associating said pumping cylinder-piston assembly with said shock absorbing cylinder-piston assembly such that said pump cylinder and said pump piston are reciprocated relative to one another to increase and decrease the volume of said pumping chamber in synchronization with a reciprocating relative motion of said shock absorbing cylinder-piston assembly;

a reservoir for storing the working fluid;

means for providing a first connection passage for connecting said pumping chamber with said reservoir, including a first check valve for allowing the working fluid to flow only from said reservoir to said pumping chamber;

means for providing a relief passage for connecting any optional portion of working fluid space on the outlet side of said first check valve with said reservoir when said shock absorber cylinder-piston assembly expands beyond a predetermined expansion limit so that a part of the working fluid pumped out of the reservoir beyond a predetermined amount is returned to the reservoir;

an accumulator for accumulating a variable volume of the working fluid, said accumulator having means for applying an elevated pressure to the working fluid accumulated therein;

means for providing a second connection passage for connecting said pumping chamber with said accumulator via neither of the first and second chamber spaces, including a second check valve for allowing the working fluid to flow only from said pumping chamber to said accumulator;

means for providing a third connection passage for connecting said accumulator with said first or second chamber space; and a variable throttle means for variably changing the through rate of said third connection passage.

According to the above-mentioned construction, the flow of the working fluid in said third passage due to the pumping action is uniformarized by the damping action of said accumulator so that a substantially uniform and thereby relatively lowered rate of flow of the working fluid is available therethrough throughout the delivery and suction strokes of the pumping system, i.e. the expansion and contraction strokes of the shock absorber even when the shock absorber is operating in a generally expanding mode, i.e. vehicle height increasing mode, while during a normal mode of operation where the shock absorber operates generally around the standard length providing the standard vehicle height, a variably controlled additional damping force is available based upon the flow of working fluid generated through said third passage due to the more and less insertion of the piston rod into the shock absorber cylinder bore, for both contraction and expansion strokes.

In this connection, it will be appreciated that said third connection passage may open to any of said first and second chamber spaces, because said first and second chamber spaces are substantially connected with one another via said first and second throttle passages provided in the shock absorber piston, and the force to bias the shock absorber piston from the side of said first chamber space to said second chamber space is generated by the difference of the effective pressure receiving area between the opposite sides of the shock absorber piston. Similarly, it will be appreciated that said relief passage may connect any optional portion of the working fluid space on the outlet side of said first check valve with said reservoir, because the closed space of the pumping and shock absorbing working fluid system is after all divided into a first closed space which is on the outlet side of said first check valve and contributes to determining the overall length of the shock absorber cylinder-piston assembly and a second closed space which is on the inlet side of said first check valve and serves only as a reservoir of the working fluid.

In the self-pumping type shock absorber of the above-mentioned construction, said pump cylinder bore may be provided in said shock absorber piston coaxially therethrough, while said pump piston may be provided in said shock absorber cylinder bore coaxially therethrough and firmly (stationarily) mounted to said shock absorber cylinder at an axial end thereof located in said first chamber space, thereby defining said pumping chamber adjacent an outer end of said shock absorber piston extending along said shock absorber cylinder, said accumulator being mounted at the outside of said shock absorber piston and connected with said first chamber space via said third connection passage.

Further, in the above-mentioned construction, said pumping cylinder-piston assembly may have a tubular member mounted in a corresponding bore coaxially formed in said shock absorber piston, with an annular space being left between said tubular member and said bore of said shock absorber piston, said third connection passage having a first part provided by said annular space and a second part extending between an outer end of said annular space and said accumulator, said variable throttle means is provided at said second part of said third connection passage.

Or, alternatively, said pump cylinder bore may be provided in said shock absorber piston coaxially therethrough, while said pump piston is provided in said shock absorber cylinder bore coaxially therethrough and firmly (stationarily) mounted to said shock absorber cylinder at an axial end thereof located in said first chamber space, thereby defining said pumping chamber adjacent an outer end of said shock absorber piston extending along said shock absorber cylinder, said reservoir being mounted at the outside of said shock absorber piston and connected with said pumping chamber via said first passage, said accumulator being positioned around said shock absorber cylinder as an annular chamber means.

In this case, the self-pumping type shock absorber may further comprise a tubular means for providing an additional annular space interposed between said shock absorber cylinder bore and said annular accumulator chamber space, said additional annular chamber space providing at least a part of said third connection passage.

In this case, the self-pumping type shock absorber may further comprise a relief valve adapted to open said first chamber space toward said accumulator when a pressure difference between the pressure of said first chamber space and that of said accumulator applied thereacross increases beyond a predetermined pressure difference value.

Further, in this case, the self-pumping type shock absorber may further comprise a relief valve adapted to open said accumulator toward said first chamber space when a pressure difference between the pressure of said accumulator and that of said first chamber space applied thereacross increases beyond a predetermined pressure difference value.

As a different modification, said shock absorber cylinder-piston assembly and said pumping cylinder-piston assembly may be independently constructed and said mechanically associating means between said shock absorber cylinder-piston assembly and said pumping cylinder-piston assembly may be a combination of a vehicle body and a stabilizer of a vehicle.

BRIEF DESCRIPTION OF THE DRAWING

In the accompanying drawing.

DESCRIPTION OF THE PREFERRED EMBODIMENTS

In the following, the present invention will be described with respect to some preferred embodiments thereof with reference to the accompanying drawing.

Figure 1:
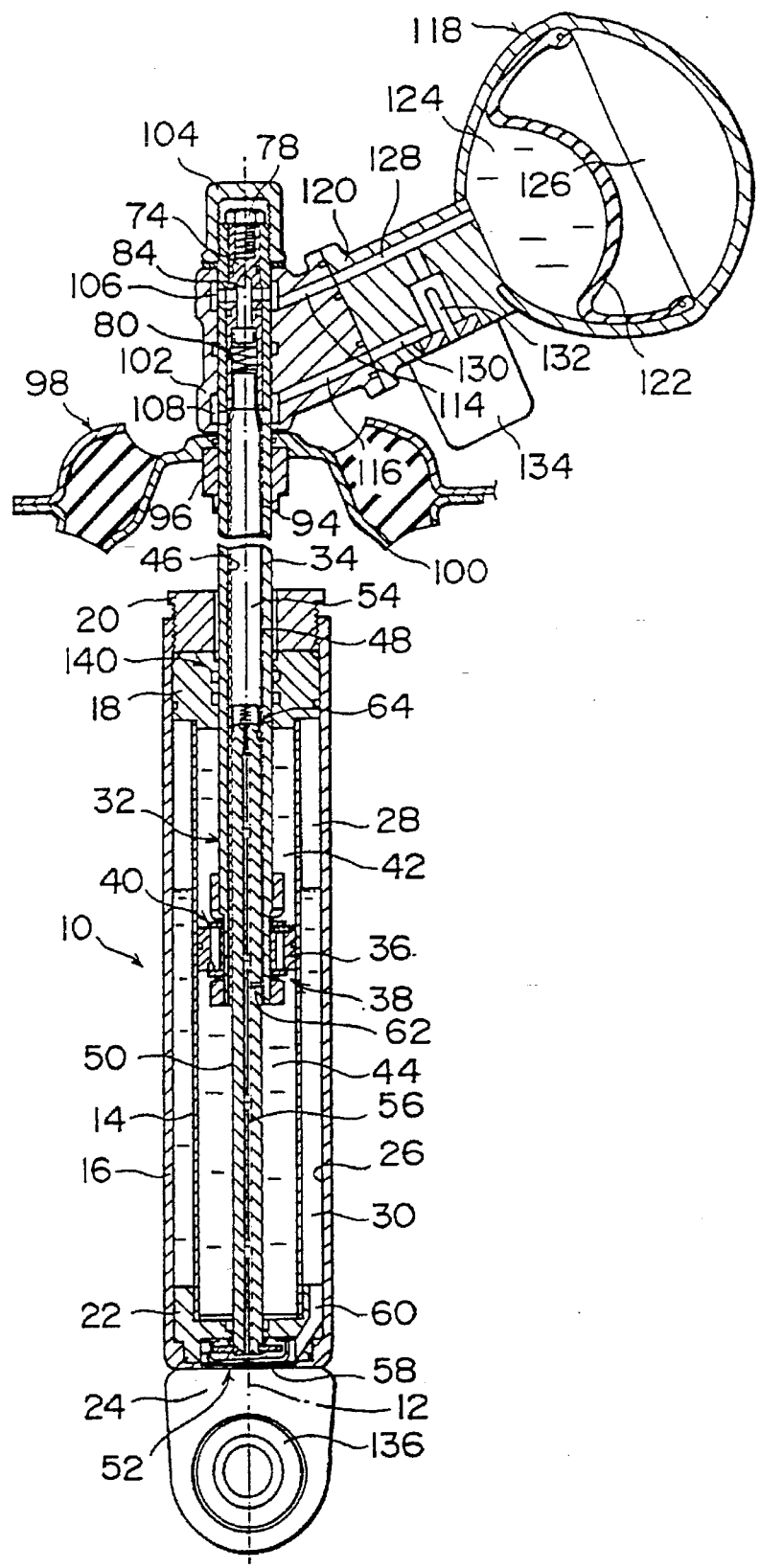
FIG. 1 is a longitudinally sectional view showing a first embodiment of the self-pumping type shock absorber according to the present invention.
Figure 2:
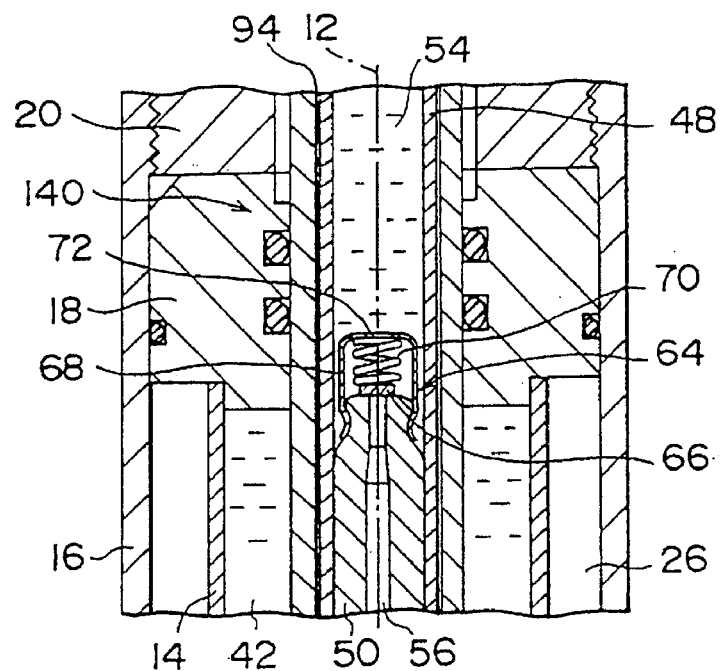
FIG. 2 is an enlarged partial longitudinally sectional view showing the intake valve and the portions therearound of the first embodiment.
Figure 3:
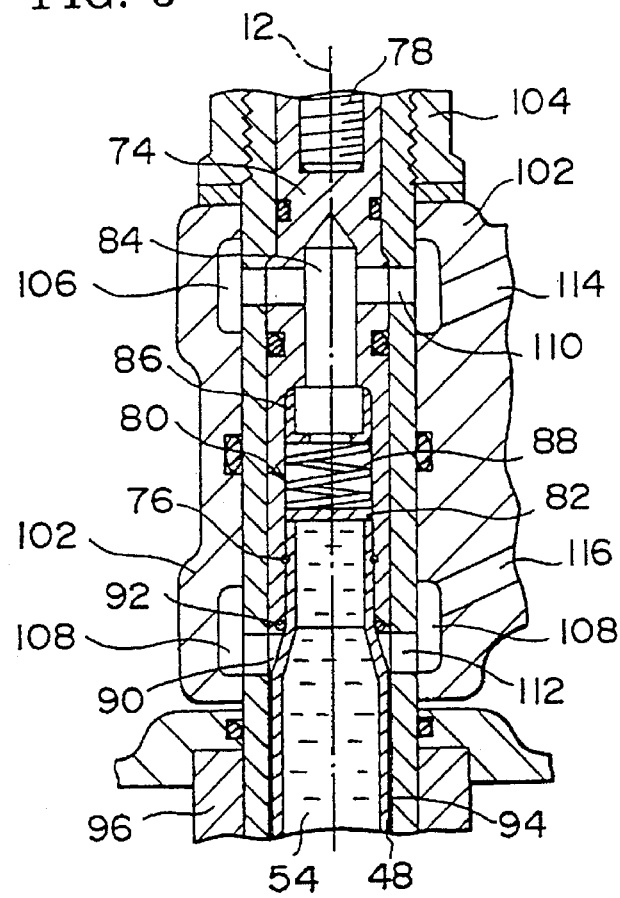
FIG. 3 is an enlarged partial longitudinally sectional view showing the delivery valve of the first embodiment.

Referring to FIGS. 1–3 showing a first embodiment of the self-pumping type shock absorber according to the present invention, 10 generally designates a cylinder which comprises an inner cylinder 14 having a cylinder bore and an outer cylinder 16, both extending coaxially along a central axis 12. The upper ends of the inner and outer cylinders 14 and 16 are doubly closed by a rod guide member 18 and an end cap 20. The lower end of the inner cylinder 14 is coaxially mounted to the outer cylinder 16 via a support member 22. The lower end of the outer cylinder 16 is closed by an end cap 24 which may be integral with the support member 22. The inner and outer cylinders 14 and 16 define therebetween an annular reservoir 26 together with the rod guide member 18 and the support member 22. In the reservoir 26, gas 28 is sealed in by working fluid (oil) 30 serving as a working fluid.

A piston 32 is provided to be able to reciprocate in the inner cylinder 14 along the axis 12. The piston 32 is made of a piston rod 34 extending along the axis 12 and a piston body 36 mounted to the lower end of the piston rod. The piston body 36 has a first damping force generation valve 38 which generates a damping force during the expansion stroke of the cylinder-piston assembly of the cylinder 14 and the piston 32 by letting the working fluid flow therethrough from an upper chamber 42 to a lower chamber 44 under a throttled condition and a second damping force generation valve 40 which generates a damping force during the contraction stroke of the cylinder-piston assembly by letting the working fluid flow therethrough from the lower chamber 44 to the upper chamber 42 under a throttled condition. The piston 32 cooperates with the inner cylinder 14 and the rod guide member 18 to define the upper working fluid chamber 42, and cooperates with the inner cylinder 14 and the support member 22 to define the lower working fluid chamber 44.

The piston rod 34 extends upward through the rod guide member 18 and the end cap 20. The piston rod 34 has an internal bore 46 extending along the axis 12. A tubular pump cylinder member 48 is stationarily mounted in the internal bore 46 to extend along the axis 12. Either of the outer circumference of the pump cylinder member 48 or the inner circumference of the piston rod 34 is formed with a plurality of grooves extending in the longitudinal direction so as thereby to define a plurality of through passages 94 which open to the lower working chamber 44 at the lower ends and open to an annular space 90 described hereinbelow. A pump rod 50 is engaged in the pump cylinder member 48 to be able to reciprocate relative to the pump cylinder along the axis 12. The lower end of the pump rod 50 is stationarily mounted to the outer cylinder 16 via a support member 52. The pump cylinder member 48 and the pump rod 50 cooperate to define a pumping chamber 54 in the pump cylinder member 48.

An internal passage 56 is formed in the pump rod 50 along the axis 12. The lower end of the internal passage 56 is open to an intermediate chamber 58 defined between the support member 52 and the end cap 24, the intermediate chamber 58 being connected with the lower end of the reservoir 26 via a passage 60 formed in the support member 22. The pump rod 50 is formed with a radial passage 62 located at a substantially middle position thereof, opening the internal passage 56 to the lower working fluid chamber 44.

As shown in more detail in FIG. 2, an intake valve 64 is provided at the upper end of the pump rod 50. The intake valve 64 comprises a disk shaped valve element 66, a cup shaped support member 68 mounted to the upper end of the pump rod 50, and a compression coil spring 70 disposed between the valve element 66 and the support member 68 to bias the valve element to a closed position thereof at which it is in contact with the upper end port surface of the pump rod 50. The support member 68 has a through opening 72. The intake valve 64 operates as a check valve which allows working fluid (oil) to flow only from the internal passage 56 to the pumping chamber 54.

As shown in more detail in FIG. 3, the upper end of the pump cylinder member 48 is deformed to a smaller diameter portion which is firmly mounted to the piston rod 34 via a support member 74 and a ring 76. The support member 74 is fastened to the upper end of the piston rod 34 by a bolt 78. A delivery valve 80 is provided above the pump cylinder member 48. The delivery valve 80 comprises a disk shaped valve element 82, a spring sheet member 86 mounted in a counterbored end of an internal passage 84 formed in the support member 74, and a compression coil spring 88 disposed between the valve element 82 and the spring sheet member 86 to bias the valve element to a closed position thereof where the valve element is in contact with the upper end port face of the pump cylinder member 48. The delivery valve 80 serves as a check valve which allows the working fluid to flow only from the pumping chamber 54 to the internal passage 84.

Below the support member 74, between the piston rod 34 and the pump cylinder member 48, there is formed the annular space 90 which forms an upper end port of the plurality of through passages 94 formed between the piston rod 34 and the pump cylinder member 48. An O-ring seal 92 provided between a lower end portion of the support member 74 and the pump cylinder member 48 seals the annular space 90.

A support member 96 is mounted adjacent to the upper end of the piston rod 34. On the support member 96 there is placed an annular inner disk 100 of an upper support 98 for mounting the piston rod 34 to a vehicle body not shown in the figure. Above the inside peripheral portion of the inner disk 100 there is placed a connection member 102 which is fastened to the upper end of the piston rod 34 by a lock nut 104 screwed around the upper end of the piston rod 34. The connection member 102 cooperates with the upper end portion of the piston rod 34 to define annular passages 106 and 108 which are connected with the internal passage 84 and the annular space 90 via connection openings 110 and 112, respectively. The annular passages 106 and 108 are connected with passages 114 and 116, respectively.

An accumulator 118 is mounted to the connection member 102 at a connecting portion 120. The accumulator 118 has a diaphragm 122, a liquid chamber 124 defined on one side of the diaphragm and serving as a high pressure working fluid accumulating chamber, and a gas chamber 126 defined on the other side of the diaphragm. The connecting portion 120 has a first passage 128 for connecting the passage 114 with the liquid chamber 124, and a second passage 130 for connecting the second passage 116 with a middle portion of the first passage 128. A variable throttle valve 132 is provided in the second passage 130. The variable throttle valve 132 is operated by an actuator 134 so that the through rate of the second passage 130 is controllably varied.

The lower end of the shock absorber is mounted to a suspension member such as a suspension arm (not shown) via a rubber bush 136 fixed to the end cap 24. Although not shown in the figure, a dust boot is provided to extend between the support member 96 and the end cap 20.

As will be understood from the foregoing descriptions, the passage 60, intermediate chamber 58 and internal passage 56 provide a low pressure passage for connecting the reservoir 26 with the pumping chamber 54; the internal passage 84, annular passage 106 and passages 114 and 128 provide a delivery passage for connecting the pumping chamber 54 with the liquid chamber 124; and the through passages 94, annular space 90, connection openings 112, annular passage 108, passages 116 and 130 and a part of the passage 128 provide a passage for connecting the lower working fluid chamber 44 with the liquid chamber 124. Since the working fluid is reciprocated through this passage as will be described in more detail hereinbelow, this passage is named a reciprocating passage. Further, the pump cylinder member 48, pump rod 50, intake valve 64, delivery valve 80, etc. provide a pump 140 which takes in the working fluid from the reservoir 26 through the low pressure passage and the intake valve 64 into the pumping chamber 54 and delivers the working fluid from the pumping chamber 54 to the liquid chamber 124 through the delivery valve 80 and the delivery passage according to increase and decrease of the volume of the pumping chamber 54 due to the expansion and contraction of the shock absorber, as described in detail hereinbelow.

In this embodiment of the above-described construction, when the piston 32 and the cylinder 10 make a relative motion of the expansion stroke according to a rebounding of the vehicle wheel not shown in the figure, the volume of the upper chamber 42 decreases, while the volume of the lower chamber 44 increases, whereby a corresponding amount of working fluid flows from the upper chamber to the lower chamber through the damping force generation valve 38, thereby generating a damping force. Further, since the volume of the piston rod 34 existing in the cylinder 10 decreases, a corresponding volume of the working fluid flows from the liquid chamber 124 to the lower chamber 44 through the reciprocation passage 94–130 including the variable throttle valve 132, thereby additionally generating a corresponding damping force controllable by the variable throttle valve 132.

Similarly, when the piston 32 and the cylinder 10 make a relative motion of the contraction stroke according to a bounding of the vehicle wheel, the volume of the upper chamber 42 increases, while the volume of the lower chamber 44 decreases, whereby a corresponding volume of working fluid flows from the lower chamber to the upper chamber through the damping force generation valve 40. Further, according to an increase of the volume of the piston rod 34 existing in the cylinder 10, a corresponding volume of working fluid flows from the lower chamber 44 to the liquid chamber 124 through the reciprocation passage 94–130 including the variable throttle valve 132, thereby additionally generating a corresponding damping force controllable by the variable throttle valve 132.

During the expansion stroke of the shock absorber, the volume of the pumping chamber 54 increases, with a corresponding decrease of the pressure therein, and therefore, the delivery valve 80 is closed, while the intake valve 64 is opened, whereby the working fluid is sucked from the reservoir 26 to the pumping chamber 54 through the low pressure passage and the intake valve 64, wherein the pump 140 performs an intake stroke. Similarly, during the contraction stroke of the shock absorber, the volume of the pumping chamber 54 decreases, with a corresponding increase of the pressure therein, and therefore, the intake valve 64 is closed, while the delivery valve 80 is opened, whereby the working fluid is delivered from the pumping chamber 54 to the liquid chamber 124 through the delivery valve 80 and the delivery passage, wherein the pump 140 performs a delivery stroke.

Therefore, the damping force of the shock absorber can be controlled to increase or decrease by increasing or decreasing the throttling action applied to the passage 130 by the variable throttle valve 132 according to a corresponding operation of the actuator 134. During the contraction stroke of the shock absorber, the working fluid flows from the pump 140 to the liquid chamber 124 as delivered therefrom, while the working fluid also flows from the lower chamber 44 to the liquid chamber 124 through the reciprocation passage. The temporal increase of the working fluid in the liquid chamber 124 is absorbed by the deformation of the diaphragm 122.

Thus, it will be appreciated that, since the flow of working fluid through the connection passage is not dependent upon the pumping flow of the pump 140, the damping force additionally applied to the stroking action of the shock absorber by the variable throttle valve 132 is available in the same manner during the expansion as well as the contraction stroke of the shock absorber. If the variable throttling valve 132 were provided in the pump delivery passage 84–128 or directly provided in the pump delivery passage with no buffering fluid chamber such as the fluid chamber 124, an additional damping force is only available during the delivery stroke of the pump (contraction stroke of the shock absorber) by the flow of working fluid directed from the pumping chamber to the reservoir 26, while during the expansion stroke of the shock absorber no additional damping force would be available by the flow of working fluid directed from the reservoir 26 to the lower chamber 42.

When the intake and delivery strokes of the pump 140 are repeated, the volume and the pressure of the working fluid existing on the outlet side of the intake valve 64 increase, so that the cylinder 10 and the piston 32 make a relative displacement to gradually increase the vehicle height, and when the vehicle height increases beyond a standard vehicle height, the lower chamber 44 is connected with the internal passage 56 by the connection opening 62, so that a part of the working fluid in the lower chamber 44 is released toward the reservoir 26. Therefore, even when the vehicle height changes temporarily according to changes of the load on the vehicle, the self-pumping operation by the pump 140 and the positioning operation of the connection opening 62 automatically resume the standard vehicle height.

Figure 4:
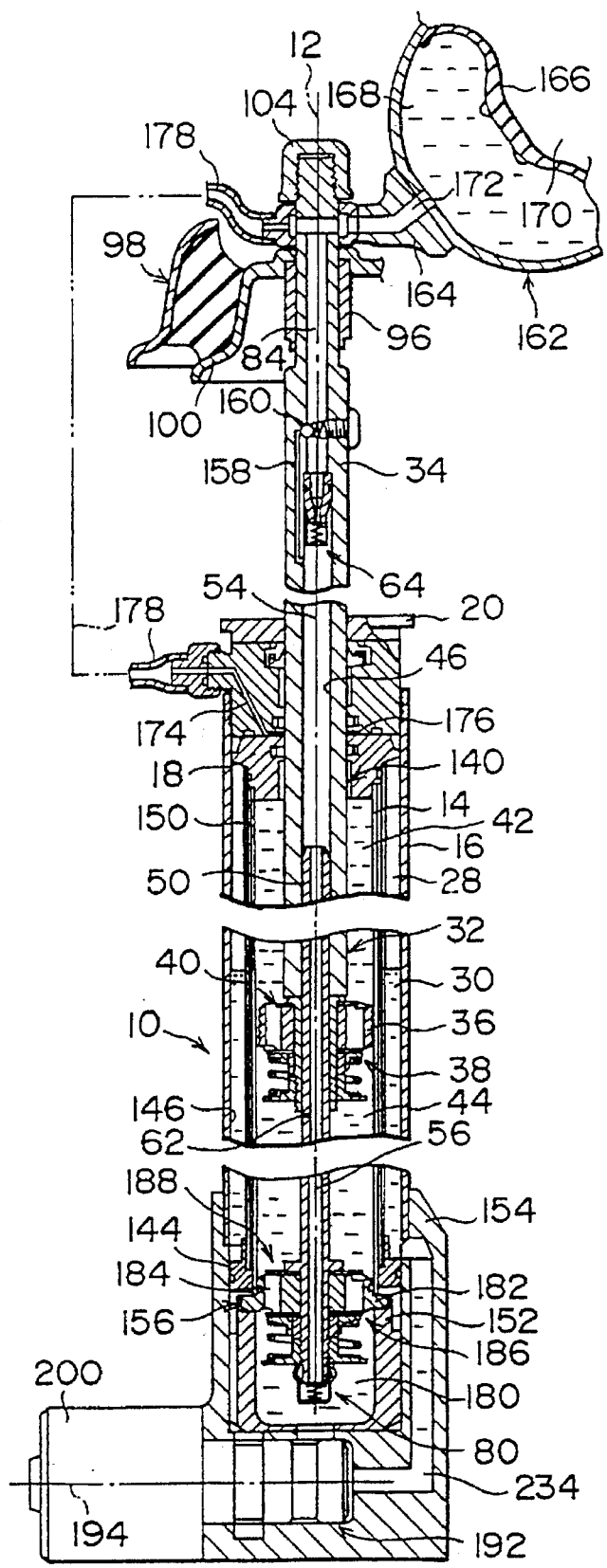
FIG. 4 is a longitudinally sectional view showing a second embodiment of the self-pumping type shock absorber according to the present invention.
Figure 5:
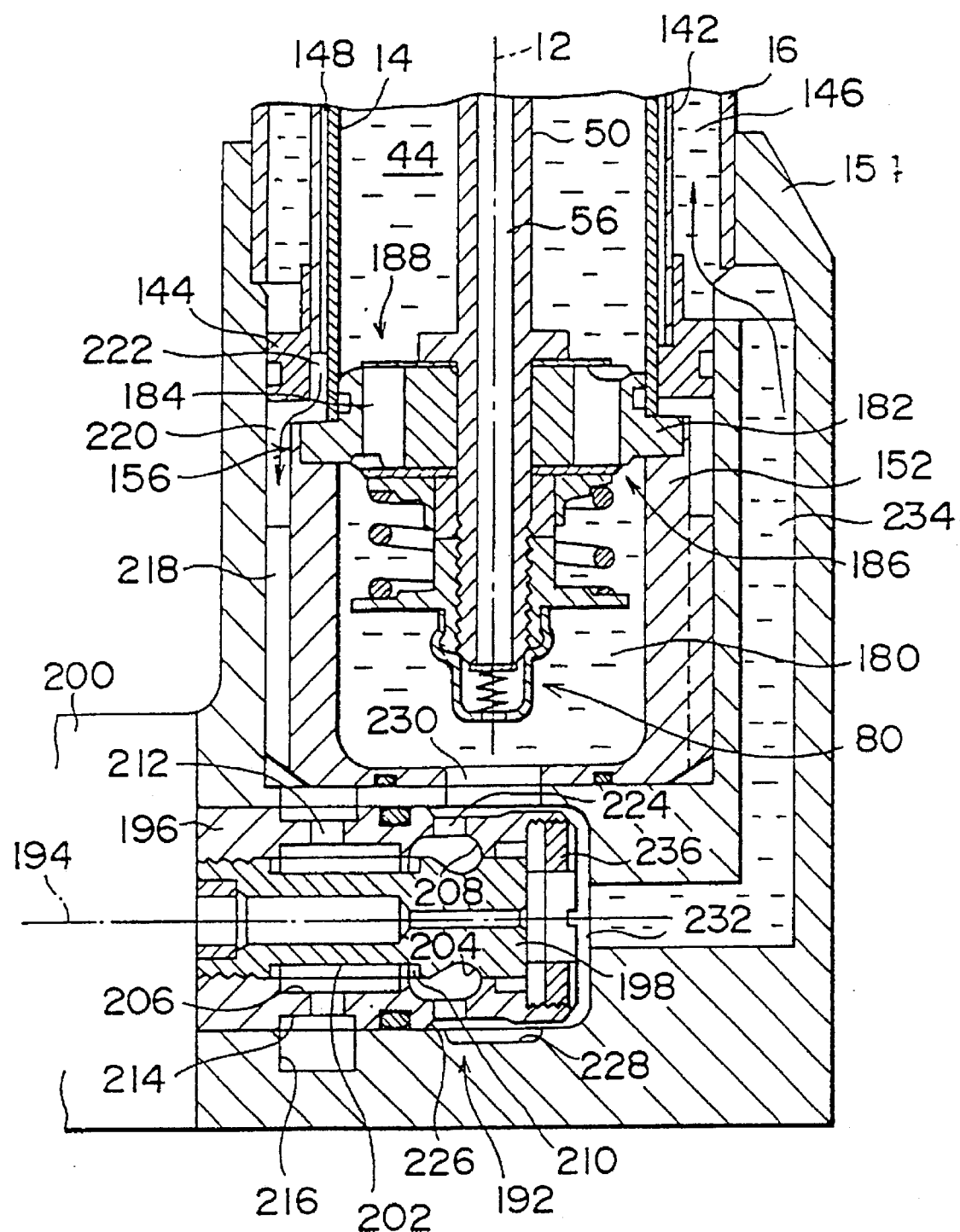
FIG. 5 is an enlarged partial longitudinally sectional view showing the damping force control valve and portions therearound of the second embodiment.

FIG. 4 is a longitudinally sectional view showing a second embodiment of the self-pumping type shock absorber according to the present invention, and FIG. 5 is an enlarged longitudinally sectional view showing the damping force control valve and portions therearound of the second embodiment. In FIGS. 4 and 5, the portions corresponding to those shown in FIGS. 1–3 are designated by the same reference numerals.

In this second embodiment, a sleeve 142 is coaxially provided around an inner cylinder 14 to define an annular chamber 146 together with an outer cylinder 16, a rod guide member 18 and a support member 144, and to define an annular passage 148 with the inner cylinder 14, the rod guide member 18 and the support member 144. The annular passage 148 is connected with an upper chamber 42 through a connection opening 150 provided at the inner cylinder 14 at a portion thereof close to the upper end thereof. The annular chamber 146 operates as the accumulator of the working fluid.

A valve casing 154 is firmly mounted to the lower end of the outer cylinder 16 for firmly mounting a base valve housing 152. A pump rod 50 is supported at a lower end thereof by a base valve assembly 156 supported by the base valve housing 152. The pump rod 50 is tapered at the upper portion thereof engaged into a central bore 46 of a piston rod 34 to define a pumping chamber 54 of a pump 140. An intake valve 64 is provided at the upper end of the central bore 46 so as to allow the working fluid to flow only from an internal passage 84 to the pumping chamber 54. A relief passage 158 is provided at the piston rod 34 to connect the pumping chamber 54 with the internal passage 84. A relief valve 160 is provided at a port where the relief passage 158 opens to the internal passage 84 so as to allow the working fluid to flow only from the pumping chamber 54 to the internal passage 84.

At the upper end of the piston rod 34 there are mounted a connecting portion 164 of a reservoir 162 and an annular inner disk 100 of an upper support 98 by a lock nut 104. The reservoir 162 has a diaphragm 166, a liquid chamber 168 defined on one side of the diaphragm, and a gas chamber 170 on the opposite side of the diaphragm. The liquid chamber 168 is connected with the upper end of the internal passage 84 by a passage 172. A small annular space 176 is defined between the rod guide member 18 and an end cap 20 and connected with a passage 174 formed in the end cap. The passage 174 is connected with the internal passage 84 via a conduit 178, so that the working fluid leaked out from the upper chamber 42 between the piston rod 34 and the rod guide member 18 is collected by the liquid chamber 168.

A valve chamber 180 is defined between the base valve housing 152 and the base valve assembly 156. The base valve assembly 156 comprises a valve sheet member 182 formed with a plurality of through passages 184 to connect the lower chamber 44 with the valve chamber 180, a check valve 186 adapted to allow the working fluid to flow only from the lower chamber 44 to the valve chamber 180 through the passages 184, and a check valve 188 adapted to allow oil to flow only from the valve chamber 180 to the lower chamber 44 through the passages 184. A delivery valve 80 is provided in the valve chamber 180 at the lower end of the pump rod 50 to allow the working fluid to flow only from the internal passage 56 to the valve chamber 180.

As shown in more detail in FIG. 5, a damping force control valve 192 is provided in the valve casing 154 below the base valve assembly 156. The control valve 192 comprises a control valve housing 196 extending along a central axis 194 perpendicular to the central axis 12 and firmly mounted in the valve casing 154, and a spool 198 engaged in the housing 196 to be shiftable along the axis 194. The spool 198 is positioned by an actuator 200 along the axis 194.

In the shown embodiment, the spool 198 has annular grooves 202 and 204, and corresponding thereto the control valve housing 196 has annular ports 206 and 208. An annular ridge between the annular grooves 202 and 204 and an annular ridge between the annular ports 206 and 208 cooperate to define a variable orifice 210 which presents an effective passage area increased or decreased according to an axial movement of the spool 198.

The annular port 206 is connected with the annular passage 148 through a connection opening 212 and annular grooves 214 and 216, a plurality of passages 218 provided in the outer circumference of the base valve housing 152 along the axis 12, a space 220 among the base housing 152, valve casing 154, support member 144 and valve sheet member 182, and a plurality of grooves 222 provided at the inner peripheral surface of the support member 144 along the axis 12. In any event, the annular space provided on the left side of the variable orifice 210 is connected with the passage 148. On the other hand, the annular groove 208 is connected with the valve chamber 180 through a connection opening 224, an annular port 226 and an annular groove 228. In any event, the annular space on the fight side of the variable orifice is connected with the valve chamber 180.

Around the control valve housing 196, within the valve casing 154, there is defined a valve chamber 232, which is connected with the accumulator 146 through a connection passage 234 provided in the valve casing 154. The valve chamber 232 is also connected with the annular space on the right side of the variable orifice 210. A stopper 236 is screwed into a right end counterbore of the control valve housing 196 for restricting the rightward movement of the spool 198, thereby defining the largest opening position of the spool. The stopper 236 has a diametrical groove at the right side surface thereof for receiving a driver tip.

Thus, the passages 84 and 172 provide a low pressure passage for connecting the pumping chamber 54 with the liquid chamber 168 serving as a reservoir, while the internal passage 56, valve chamber 180, connection opening 230, annular grooves 228 and 226, valve chamber 232 and connection passage 234 provide a high pressure passage for connecting the pumping chamber 54 with the accumulator 146. The connection opening 150, annular passage 148, grooves 222, space 220, grooves 218, connection opening 212, annular grooves 216 and 214, annular port 206, annular groove 202, variable orifice 210, annular grooves 204 and 208, connection opening 224, annular grooves 226 and 228, and connection opening 230 provide a bypass passage for connecting the upper chamber 42 with the valve chamber 180, and further with the valve chamber 232, a further extension of the bypass passage up to the accumulator 146. The additional and variably controlled damping force is applied by the damping force control valve 192 provided in the bypass passage so as to regulate the effective passage opening of the variable orifice 210, thereby regulating the flow resistance against the working fluid flow therethrough, thereby controlling the additional damping force, in the same manner as effected in the first embodiment shown in FIGS. 1–3. Thus, it will be appreciated that also in this second embodiment, the damping force of the self-pumping type shock absorber is variably controlled by utilizing the self-pumping system.

Figure 6:
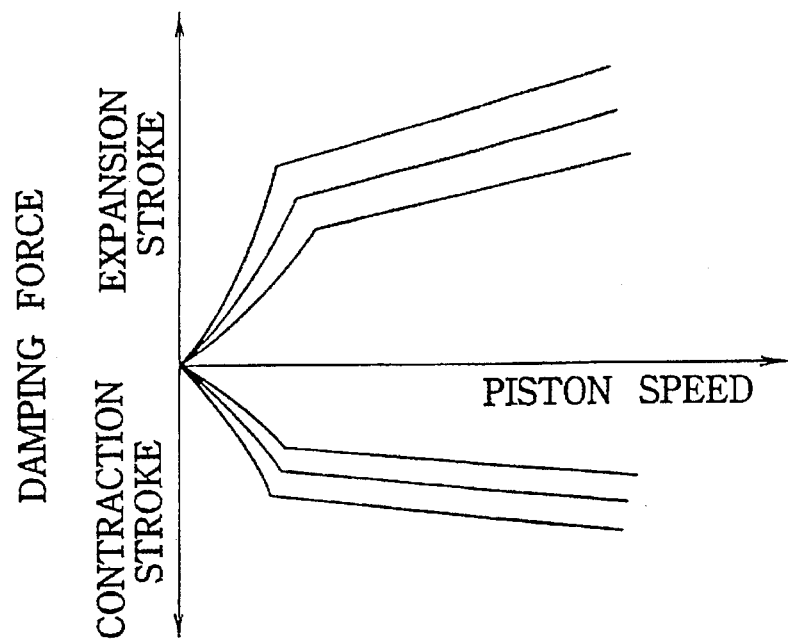
FIG. 6 is a graph showing the damping force performance of the second embodiment.

Further, in this second embodiment, when the piston 32 moves upward in the expansion stroke at a speed not higher than a predetermined speed value, the check valve 186 provided at the base valve assembly 156 does not open, but when the speed of the expansion stroke increases beyond the predetermined speed value, the check valve 186 is opened, so that the resistance applied to the movement of the piston relative to the cylinder is correspondingly decreased. Similarly, when the piston 32 moves downward in the contraction stroke at a speed not higher than a predetermined speed value, the check valve 188 provided at the base valve assembly 156 does not open, but when the speed of the contraction stroke increases beyond the predetermined speed value, the check valve 188 is opened, so that the resistance applied to the movement of the piston relative to the cylinder is correspondingly decreased. By this arrangement, the damping force performance of the shock absorber can be modified as shown in FIG. 6.

Also in this second embodiment, as in the first embodiment, the amount of the working fluid passing through the variable orifice 210 is not substantially affected according to whether the pumping stroke is the delivery stroke or the intake stroke, and therefore, the damping force can be variably controlled throughout the reciprocating stroke action of the self-pumping type shock absorber.

Also in this embodiment, when the expansion and contraction strokes are repeated, with the pump 140 repeating the intake and delivery strokes, the amount and the pressure of the working fluid on the outlet side of the intake valve 64 increases, so that the vehicle height gradually increases. However, since the pump rod 50 has a tapered upper end portion, the clearance between the pump rod 50 and the central bore 46 gradually increases as the vehicle height increases, whereby the pumping efficiency of the pump 140 gradually lowers. Therefore, the rate of increase of the volume and the pressure of the working fluid on the outlet side of the intake valve 64 is gradually decreased as the vehicle height approaches a standard height. Nevertheless, when the vehicle height increases beyond the standard height, the lower chamber 44 is connected with the internal passage 56 through the connection opening 62, whereby a part of the working fluid of the lower chamber 44 is exhausted through the connection opening 62, internal passage 56, relief passage 158, relief valve 160, internal passage 84 and passage 172 to the liquid chamber 168. Thus, even when the vehicle height has lowered below the standard vehicle height due to a load increase, the vehicle height is automatically resumed to the standard height by the pumping operation of the pump 140 and the positioning operation of the connection opening 62.

Figure 7:
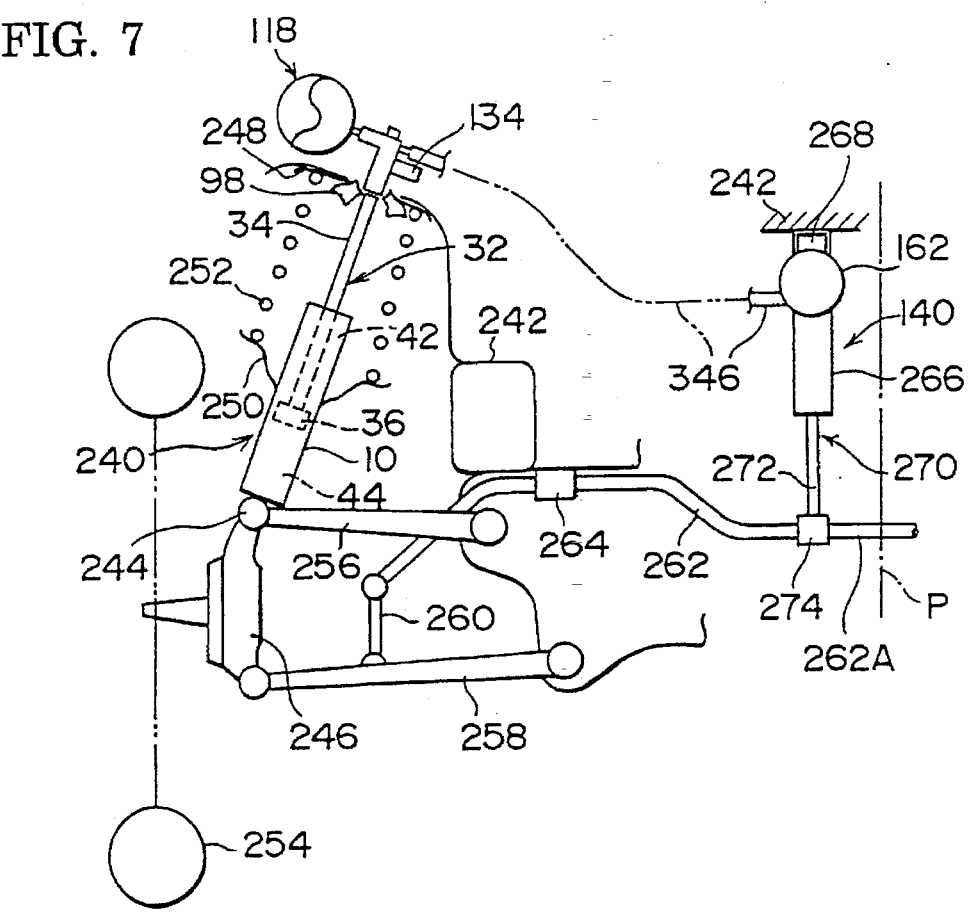
FIG. 7 is a diagrammatical front view showing a third embodiment of the self-pumping type shock absorber according to the present invention.
Figure 8:
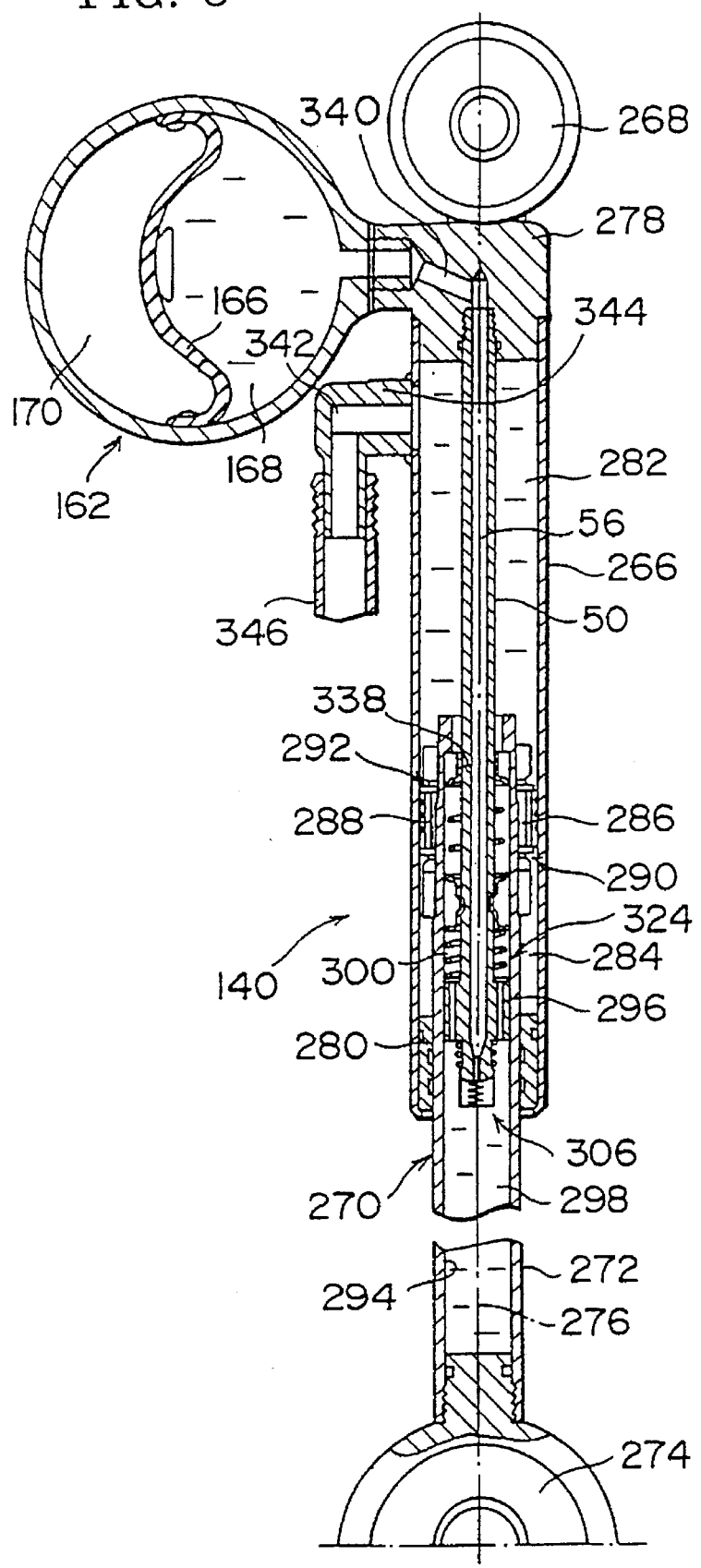
FIG. 8 is an enlarged longitudinally sectional view showing the pump of the third embodiment.
Figure 9:
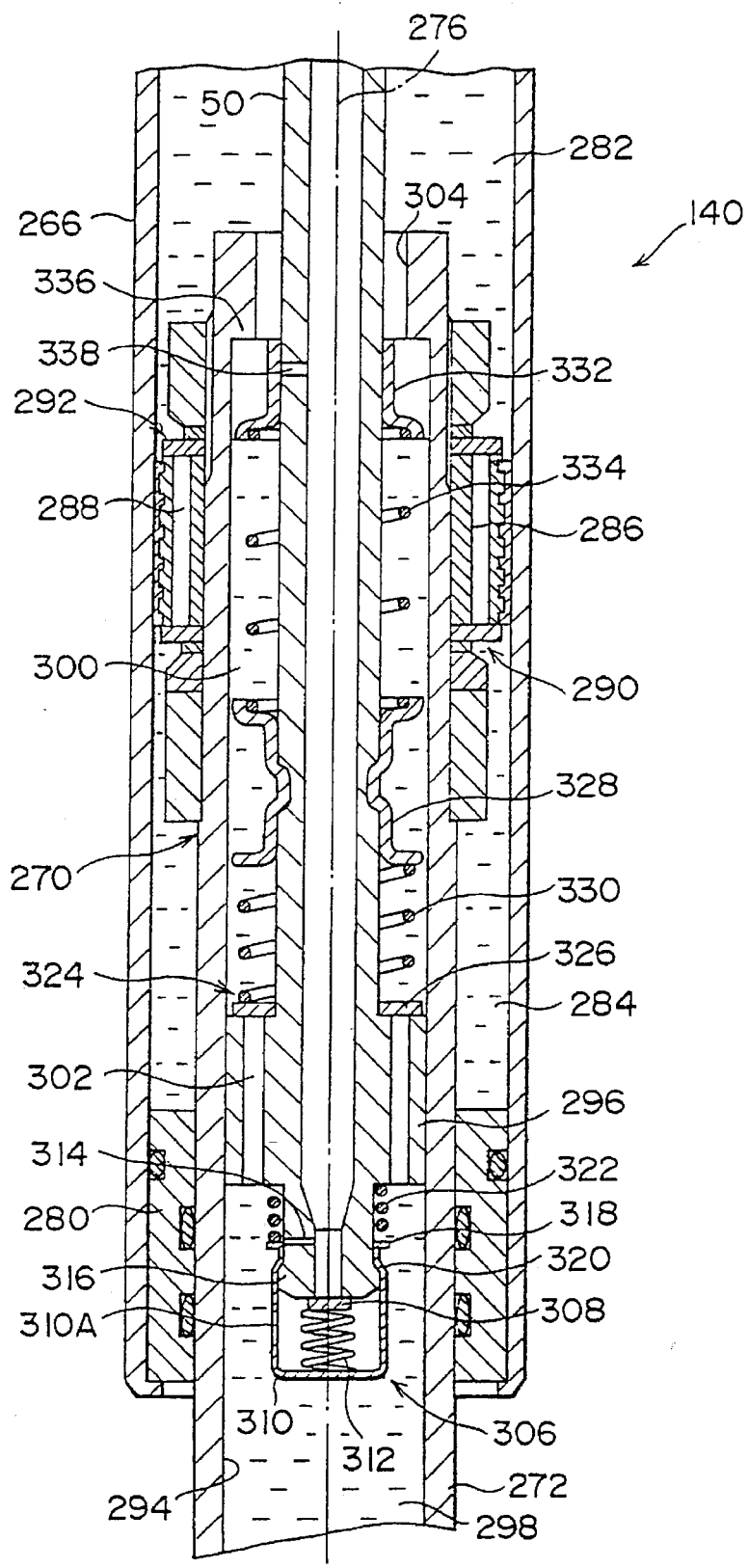
FIG. 9 is an enlarged partial longitudinally sectional view showing the essential portions of the pump shown in FIG. 8.
Figure 10:
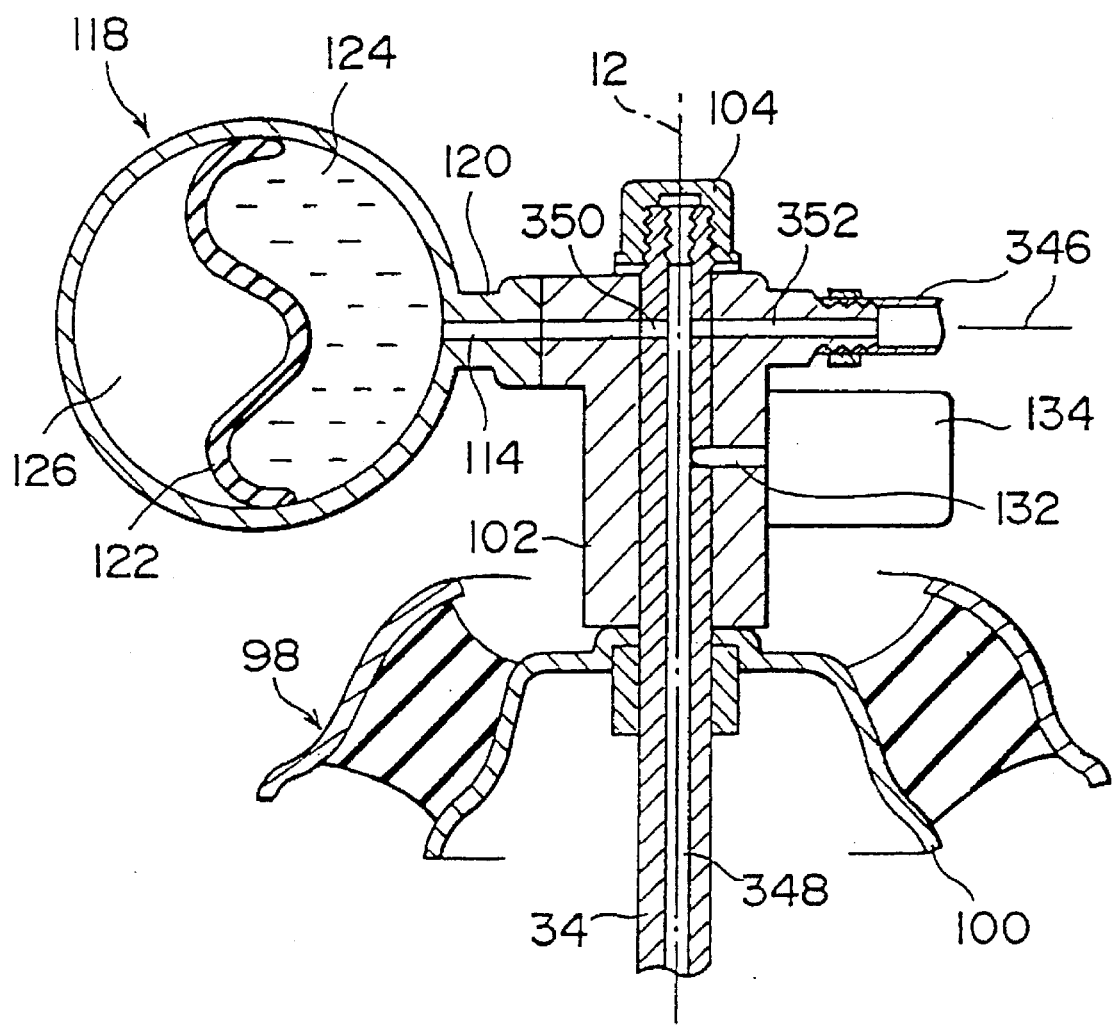
FIG. 10 is an enlarged partial longitudinally sectional view showing the damping force control valve and portions therearound of the third embodiment.

FIG. 7 is a front view showing schematically a third embodiment of the self-pumping type shock absorber according to the present invention, wherein the pump is constructed as a means separated from the main body of the shock absorber. FIG. 8 is an enlarged longitudinally sectional view showing the pump of the third embodiment, FIG. 9 is an enlarged partial longitudinally sectional view showing the essential portion of the pump, and FIG. 10 is an enlarged partial longitudinally sectional view showing the damping force control valve and portions therearound of the third embodiment. In FIGS. 7–10, the portions corresponding to those shown in FIGS. 1–3 or 4 and 5 are designated by the same reference numerals as in those figures.

In the third embodiment, the body 240 of the shock absorber and the pump 140 are constructed as separate means. The shock absorber body 240 is connected to a vehicle body 242 at the upper end of the piston rod 34 via an upper support 98, and is connected at the lower end of the cylinder 10 with an upper end of a carrier 246 by a joint 244 including a rubber bush. A compression coil spring 252 is mounted between an upper spring sheet 248 provided at the upper support 98 and a lower spring sheet 250 mounted to the cylinder 10.

The carrier 246 supports a vehicle wheel 254 to be rotatable and is connected with the vehicle body 242 via an upper arm 256 and a lower arm 258. The lower arm 258 is connected with an outer end of a stabilizer 262 via a connection link 260. The stabilizer 262 is supported by a bracket 264 at opposite sides of the central plane P of the vehicle, and has an offset portion 262A at a central portion thereof. The pump 140 is connected with the vehicle body 242 at the upper end of a cylinder 266 by a joint 268 including a rubber bush, while it is connected at the lower end of a piston rod 272 of a piston 270 with the offset portion 262A via a joint 274 including a rubber bush, such that the pump 140 is contracted and expanded due to swaying of the offset portion 262A according the bounding and rebounding of the vehicle wheel 254.

As shown in FIG. 8, the cylinder 266 and the piston 270 engage with one another to be able to relatively reciprocate along an axis 276 and cooperate with end caps 278 and 280 mounted to upper and lower ends of the cylinder, thereby defining an upper chamber 282 and a lower chamber 284. The piston body 286 of the piston 270 is provided with a plurality of connection openings 288 for connecting the upper chamber 282 with the lower chamber 284, a check valve 290 which allows the working fluid to flow only from the upper chamber 282 to the lower chamber 284 through the connection passages 288, and a check valve 292 which allows the working fluid to flow only from the lower chamber to the upper chamber through the connection openings 288.

The piston rod 272 has an internal bore 294 closed at a lower end thereof by a stop portion formed integral with an outer cylinder member of the joint 274 including a rubber bush. A pump piston 296 of the pump rod 50 is engaged in the piston rod 272 to be able to relatively reciprocate along the axis 276. The upper end of the pump rod 50 is mounted to the end cap 278. The pump piston 296 cooperates with the piston rod 272 to define a first pumping chamber 298 and a second pumping chamber 300 below and above the pump piston, respectively. A connection opening is provided in the pump piston 296 to connect the first pumping chamber 298 with the second pumping chamber 300, and the second pumping chamber 300 is connected to the upper chamber 282 through a connection opening 304 provided at an upper end of the pump rod 272.

In the first pumping chamber 298, at the lower end of the pump rod 50, there is provided a check valve 306 corresponding to the intake valve 64 of the first embodiment. The check valve 306 comprises a disk like valve element 308, a support member 310 mounted at the lower end of the pump rod 50 and having an opening 310A, and a compression coil spring 312 biasing the valve element to its closed position as depicted in the figure, so as thereby to operate as a check valve which allows the working fluid to flow only from the internal passage 56 to the first pumping chamber 298.

The pump rod 50 is provided with a connection opening 314 at a lower end portion thereof which extends perpendicular to the axis 276 and connects the internal passage 56 with the first pumping chamber 298 and a stopper portion 316. The support member 310 is formed with a flange portion 318 at an upper end thereof and a following shoulder portion 320. A compression coil spring 322 is mounted between the flange portion 318 and the pump piston 296. The support member 310 is biased by the compression coil spring 322 to the lower end position as depicted in the figure, where the shoulder portion 320 engages the stopper portion 316, thereby releasing the connection opening 314.

A second check valve 324 is provided at an upper portion of the pump piston 296. The check valve 324 comprises a substantially annular plate valve element 326 engaged around the pump rod 50 to be able to reciprocate therealong so as to open or close the upper ends of the connection openings 302, a spring sheet member 328 fixedly mounted to the pump rod 50, and a compression coil spring 330 disposed between the spring sheet member 328 and the valve element 326 for biasing the valve element to its closed position as depicted in the figure, where it is abutted to the upper surface of the pump piston 296, thereby operating as a check valve which allows the working fluid to flow only from the first pumping chamber 298 to the second pumping chamber 300 through the connection openings 302.

A connection control valve 332 is provided in the second pumping chamber 300. The connection control valve 332 has a substantially cylindrical shape and is engaged around the pump rod 50 to be able to reciprocate therealong. A compression coil spring 334 is mounted between the lower end of the connection control valve 332 and the spring sheet 328 such that upper and lower ends of the compression coil spring 334 are engaged into flange portions of the connection control valve 332 and the spring sheet 328 to be stably held therein. A stopper 336 is provided at an upper end of the piston rod 272 at the inside thereof.

When the connection control valve 332 is at a normal operating condition as depicted in the figure removed from the stopper 336, it blinds a connection passage 338 provided at the pump rod 60 so as to maintain the closed condition of the connection passage 338, maintaining a condition that the communication between the internal passage 56 and the second pumping chamber 300 is intercepted. However, when the pump 140 expands beyond a predetermined amount, the flange portion of the connection control valve 332 engages the stopper 336, and then the connection control valve is shifted downward relative to the pump rod 50 against the spring force of the compression coil spring 334, such that the connection passage 338 is opened, whereby the internal passage 56 is connected with the upper chamber 282.

The internal passage 56 of the pump rod 50 is connected with a liquid chamber 168 of a reservoir 162 through an internal passage 340 provided at the end cap 278. A nipple 344 is provided adjacent the upper end of the cylinder 266 having an internal passage 342 connected with the upper chamber 282. A pressure hose 346 is connected to the nipple 344 at one end thereof. As shown in detail in FIG. 10, the other end of the hose 346 is connected to a connection member 102 fixed to the upper end of the piston rod 34 of the shock absorber 240 by a lock nut 104. An internal passage 348 is provided in the piston rod 34 to communicate at a lower end thereof with a lower chamber 44, and there is also provided an internal passage 350 connected with the internal passage 348 and extending perpendicularly to the axis 12. The connection member 102 has an internal passage 352 connected with the internal passage 350. The internal passage 352 is connected with the hose 346.

An accumulator 118 is connected to the connection member 102 at its connecting portion 120 such that a liquid chamber 124 serving as a high pressure liquid chamber is connected with the internal passage 352 via an internal passage 114 formed in the connecting portion 120. A variable throttle valve 132 is provided in the internal passage 348. The variable throttle valve 132 is driven by an actuator 134 such that the through rate of the internal passage 348 is varied thereby. Although not shown in detail in FIG. 7, the piston body 36 is provided with a damping force generation valve for the expansion stroke and a damping force generation valve for the contraction stroke in the same manner as in the first embodiment shown in FIGS. 1–3.

Thus, the internal passages 340 and 56 provide a low pressure passage for connecting the liquid chamber 168 with the first pumping chamber 298, and the internal passages 346, 352, 350 and 114 provide a high pressure passage for connecting the pumping chamber with the liquid chamber 124 of the accumulator 118 via delivery valves 306. The reciprocation passage for conducting the working fluid for the variably controlled additional damping chamber is provided by the passages 348,350 and 114.

The operation of this third embodiment is substantially the same as in the above-described first and second embodiments, and it will be appreciated that also in this third embodiment, the damping force of the self-pumping type shock absorber is variably controlled by utilizing the self-pumping system. When the vehicle wheel 254 bounds and rebounds, there occurs not only a flow of working fluid between the upper chamber 42 and the lower chamber 44 but also a flow of the working fluid between the liquid chamber 124 of the accumulator 118 and the upper and lower chambers 42 and 44 through the high pressure passage 348, 350 and 114 by traversing the variable throttle valve 132 due to the change of the volume of the piston rod 34 exiting the cylinder 10, and therefore by controlling the through rate of the high pressure passage by the variable throttle valve 132 with the actuator 134, the damping force generated by the variable throttle valve 132 is adjusted to increase or decrease, adjustably controlling the damping force of the shock absorber.

Further, when the vehicle 254 bounds and rebounds, the lower arm 258 swings about the pivot point on the side of the vehicle body such that the swing movement is transmitted to the stabilizer 262 by the connection link 260, thereby swaying the offset portion 262A, so that the pump 140 is expanded when the vehicle wheel rebounds and is contracted when the vehicle wheel bounds.

In the expansion stroke of the pump 140, the volume of the first pumping chamber 298 increases, while the volume of the second pumping chamber 300 decreases, and therefore, the second check valve 324 is maintained in the closed position, while the first check valve 306 is opened, whereby the working fluid is sucked from the liquid chamber 168 to the first pumping chamber 298 through the passages 340 and 56 and the first check valve 306, while the working fluid is delivered from the second pumping chamber 300 to the upper chamber 282 through the connection opening 304, thus, the first pumping chamber 298 performing the suction stroke, while the upper chamber 282 performing the delivery stroke.

In the contraction stroke of the pump 140, the volume of the first pumping chamber 298 decreases, while the volume of the second pumping chamber 300 increases, so that the first check valve 306 is maintained at the closed position, while the second check valve 324 is opened, whereby the working fluid is delivered from the first pumping chamber 298 to the second pumping chamber 300, but since the volume of the pump rod 50 existing in the piston rod 272 increases, and since the amount of the increase of the volume of the second pumping chamber 300 is smaller than the amount of decrease of the volume of the first pumping chamber 298, a volume of the working fluid corresponding to the difference is supplied from the second pumping chamber 300 to the upper chamber 282, and thus, there occurs a delivery stroke to the second pumping chamber 300 and a delivery stroke to the upper chamber 282.

Thus, according to the third embodiment, the delivery of working fluid to the shock absorber body 240 by the pump 140 is carried out during the contraction stroke of the pump substantially synchronized with the contraction stroke of the shock absorber body which delivers the working fluid from the upper and lower chambers 42 and 44 to the liquid chamber 124 through the high pressure passage 348, while the working fluid delivered from the pump 140 is also supplied to the liquid chamber 124 of the accumulator 118 through the hose 346, passages 352, 350 and 114.

When the suction and delivery strokes of the pump 140 are repeated, the working fluid is gradually transferred from the pump reservoir 168 to the accumulator 118 and the space of the upper and lower chambers 42 and 44, thereby gradually shifting the piston 32 and the cylinder 10 relative to one another in the direction of expansion, thus increasing the vehicle height and also correspondingly expanding the pump 140. However, when the relative displacement reaches a predetermined amount, the connection control valve 332 is opened so that the second pumping chamber 300 is connected with the internal passage 56 through the opening 338, whereby a part of the oil in the upper chamber 282 and the lower chamber 284 is exhausted toward the reservoir 168. Therefore, even when the vehicle height lowers according to an increase of the load on the vehicle, the vehicle height is automatically returned to the standard vehicle height determined by the position of the connection opening 338, by the pumping action of the pump 140 performed according to the bounding and rebounding of the vehicle wheel and the positioning action of the connection control valve 332.

In this embodiment, the shock absorber 240 is connected with the vehicle body 242 at the upper end of the piston rod 34 and the carrier 246 at the lower end of the cylinder 10, so that the sprung upper load is supported by a cooperation of a compression coil spring 252 and the pressure of the liquid chamber 124 of the accumulator 118.

Although the present invention has been described in detail with respect to some particular embodiments thereof, it will be apparent for those skilled in the art that various modifications are possible with respect to the shown embodiments.

For example, although in the above-mentioned first embodiment the second passage 130 is connected with the liquid chamber 124 via a part of the first passage 128, while in the above-mentioned third embodiment the hose 346 is connected with the liquid chamber 124 via the passages 352, 250 and 114, the first passage 130 and the hose 346 may be directly connected to the liquid chamber 124. Further, although in the above-mentioned third embodiment the pump 140 is positioned between the vehicle body 242 and the offset portion 262A of the stabilizer 262, it may be provided between any member which changes its position relative to the vehicle body according to the bounding and rebounding of the vehicle wheel.

I claim:

1. A self-pumping type shock absorber comprising:

a shock absorbing cylinder-piston assembly having a cylinder having a bore and a piston, said piston including a disk portion and a rod portion and being slidably engaged in said cylinder bore at said disk portion to define first and second chamber spaces for receiving a working fluid therein, said rod portion extending through said second chamber space out of said cylinder bore;

means for providing a first throttle passage for applying a throttling action to the working fluid flowing from said first chamber space to said second chamber space;

means for providing a second throttle passage for applying a throttling action to the working fluid flowing from said second chamber space to said first chamber space;

a pumping cylinder-piston assembly having a first cylinder having a bore and a piston slidably engaged in said pumping cylinder bore to define a pumping chamber for the working fluid;

means for mechanically associating said pumping cylinder-piston assembly with said shock absorbing cylinder-piston assembly such that said pumping cylinder and said pumping piston are reciprocated relative to one another to increase and decrease the volume of said pumping chamber in synchronization with a reciprocating relative motion of said shock absorbing cylinder-piston assembly;

a reservoir for storing the working fluid;

means for providing a first connection passage for connecting said pumping chamber with said reservoir, including a first check valve for allowing the working fluid to flow only from said reservoir to said pumping chamber;

means for providing a relief passage for connecting any optional portion of working fluid space on an outlet side of said first check valve with said reservoir when said shock absorbing cylinder-piston assembly expands beyond a predetermined expansion limit so that a part of the working fluid pumped out of said reservoir beyond a predetermined amount is returned to said reservoir;

an accumulator for accumulating a variable volume of the working fluid, said accumulator having means for applying an elevated pressure to the working fluid accumulated therein;

means for providing a second connection passage for connecting said pumping chamber with said accumulator via neither of said first and second chamber spaces, including a second check valve for allowing the working fluid to flow only from said pumping chamber to said accumulator;

means for providing a third connection passage for connecting said accumulator with said first or second chamber space; and a variable throttle means for variably changing the through rate of said third connection passage.

2. A self-pumping type shock absorber according to claim 1, wherein said pumping cylinder bore is provided in said shock absorbing piston coaxially therethrough, while said pumping piston is provided in said shock absorbing cylinder bore coaxially therethrough and stationarily mounted to said shock absorbing cylinder at an axial end thereof located in said first chamber space, thereby defining said pumping chamber adjacent an outer end of said shock absorbing piston extending along said shock absorbing cylinder, said accumulator being mounted at the outside of said shock absorbing piston and connected with said first chamber space via said third connection passage.

3. A self-pumping type shock absorber according to claim 2, wherein said pumping cylinder-piston assembly has a tubular member mounted in a corresponding bore coaxially formed in said shock absorbing piston, with an annular space being left between said tubular member and said bore of said shock absorbing piston, said third connection passage having a first part provided by said annular space and a second part extending between an outer end of said annular space and said accumulator, said variable throttle means being provided at said second part of said third connection passage.

4. A self-pumping type shock absorber according to claim 1, wherein said pumping cylinder bore is provided in said shock absorbing piston coaxially therethrough, while said pumping piston is provided in said shock absorbing cylinder bore coaxially therethrough and stationarily mounted to said shock absorbing cylinder at an axial end thereof located in said first chamber space, thereby defining said pumping chamber adjacent an outer end of said shock absorbing piston extending along said shock absorbing cylinder, said reservoir being mounted at the outside of said shock absorbing piston and connected with said pumping chamber via said first passage, said accumulator being positioned around said shock absorbing cylinder as an annular chamber means.

5. A self-pumping type shock absorber according to claim 4, further comprising a tubular means for providing an additional annular space interposed between said shock absorbing cylinder bore and said annular accumulator chamber space, said additional annular chamber space providing at least a part of said third connection passage.

6. A self-pumping type shock absorber according to claim 4, further comprising a relief valve adapted to open said first chamber space toward said accumulator when a pressure difference between the pressure of said first chamber space and that of said accumulator applied thereacross increases beyond a predetermined pressure difference value.

7. A self-pumping type shock absorber according to claim 4, further comprising a relief valve adapted to open said accumulator toward said first chamber space when a pressure difference between the pressure of said accumulator and that of said first chamber space applied thereacross increases beyond a predetermined pressure difference value.

8. A self-pumping type shock absorber according to claim 1, wherein said shock absorbing cylinder-piston assembly and said pumping cylinder-piston assembly are independently constructed and said mechanically associating means between said shock absorbing cylinder-piston assembly and said pumping cylinder-piston assembly includes a combination of a vehicle body and a stabilizer of a vehicle.

9. A self-pumping type shock absorber according to claim 8, wherein said pumping cylinder-piston assembly further comprises a second cylinder stationarily connected with said piston rod thereof and receiving said first cylinder therein as sealingly engaged therewith so as to define an additional pumping space which further decreases said working fluid space on the outlet side of said first check valve along with a decrease of said pumping chamber.

10. A self-pumping type shock absorber according to claim 9, wherein said additional pumping space forms a part of said second connection passage.

* * * * *

UNITED STATES PATENT AND TRADEMARK OFFICE
CERTIFICATE OF CORRECTION

PATENT NO. : 5,647,580
DATED : July 15, 1997
INVENTOR(S) : Shuuichi BUMA

It is certified that error appears in the above-indentified patent and that said Letters Patent is hereby corrected as shown below:

On the cover page, Box [73], change "Nagoya" to --Aichi-ken--.

Signed and Sealed this

Twenty-fifth Day of November, 1997

Attest:

BRUCE LEHMAN

Attesting Officer

Commissioner of Patents and Trademarks